United States Patent
Fumagalli et al.

(10) Patent No.: US 12,533,832 B2
(45) Date of Patent: Jan. 27, 2026

(54) MOULD FOR ROTATIONAL MOULDING

(71) Applicant: PERSICO S.P.A., Nembro (IT)

(72) Inventors: Andrea Fumagalli, Nembro (IT); Sergio Battista Gastaldi, Nembro (IT); Matteo Radi, Nembro (IT)

(73) Assignee: PERSICO S.P.A., Nembro (IT)

( * ) Notice: Subject to any disclaimer, the term of this patent is extended or adjusted under 35 U.S.C. 154(b) by 78 days.

(21) Appl. No.: 18/689,262

(22) PCT Filed: Sep. 2, 2022

(86) PCT No.: PCT/IT2022/050241
§ 371 (c)(1),
(2) Date: Mar. 5, 2024

(87) PCT Pub. No.: WO2023/031981
PCT Pub. Date: Mar. 9, 2023

(65) Prior Publication Data
US 2024/0408799 A1    Dec. 12, 2024

(30) Foreign Application Priority Data

Sep. 6, 2021   (IT) .................. 102021000022991
Nov. 23, 2021  (IT) .................. 102021000029543

(51) Int. Cl.
*B29C 41/46* (2006.01)
*B29C 41/06* (2006.01)
*B29C 41/38* (2006.01)

(52) U.S. Cl.
CPC ............. *B29C 41/46* (2013.01); *B29C 41/06* (2013.01); *B29C 41/38* (2013.01)

(58) Field of Classification Search
CPC .......... B29C 41/06; B29C 41/38; B29C 41/46
See application file for complete search history.

(56) References Cited

U.S. PATENT DOCUMENTS

| 3,104,423 | A | * | 9/1963 | Kemper | .................. B29C 41/06 |
| | | | | | 425/429 |
| 6,207,938 | B1 | | 3/2001 | Taylor | |
| 10,939,505 | B2 | * | 3/2021 | Wegener | ............... H05B 1/0236 |
| 12,013,433 | B2 | * | 6/2024 | Jingu | ..................... H05B 3/283 |

(Continued)

FOREIGN PATENT DOCUMENTS

| EP | 1013148 A1 | 6/2000 |
| EP | 2832519 A1 | 2/2015 |
| EP | 2960032 A1 | 12/2015 |

(Continued)

*Primary Examiner* — Emmanuel S Luk
(74) *Attorney, Agent, or Firm* — FISHERBROYLES, LLP; Roger L. Browdy; Ronni S. Jillions

(57) ABSTRACT

Mould (99) for rotational moulding comprising a main body (90) having an inner cavity (91) and an outer surface (92), a plurality of heating elements (1) distinct from each other and removably fixed to the main body (90) in distributed way onto the outer surface (92), each heating element (1) comprising a thermally conductive base body (2) in thermal contact with the outer surface (92), an electrically insulating layer (6) adhered to the base body (2) at opposite side to the outer surface (92), an electrically resistive track (7) made on the electrically insulating layer (6), wherein the base bodies (2) are spatially separated from each other.

10 Claims, 3 Drawing Sheets

(56) References Cited

U.S. PATENT DOCUMENTS

2004/0149733 A1    8/2004  Abbott
2016/0205726 A1*  7/2016  Spielmann ............... H05B 3/34
                                                          219/543

FOREIGN PATENT DOCUMENTS

| EP | 3526001 A1 | 8/2019 | |
|---|---|---|---|
| IT | MI20101486 A1 | 2/2012 | |
| WO | 2020165307 A1 | 8/2020 | |
| WO | WO-2020197092 A1 * | 10/2020 | ............. B29C 33/42 |

* cited by examiner

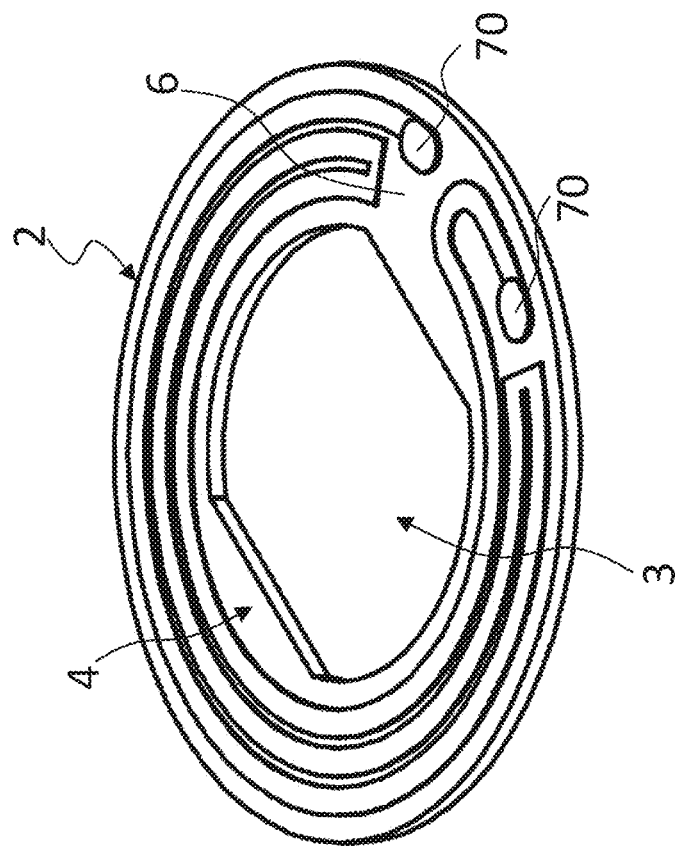
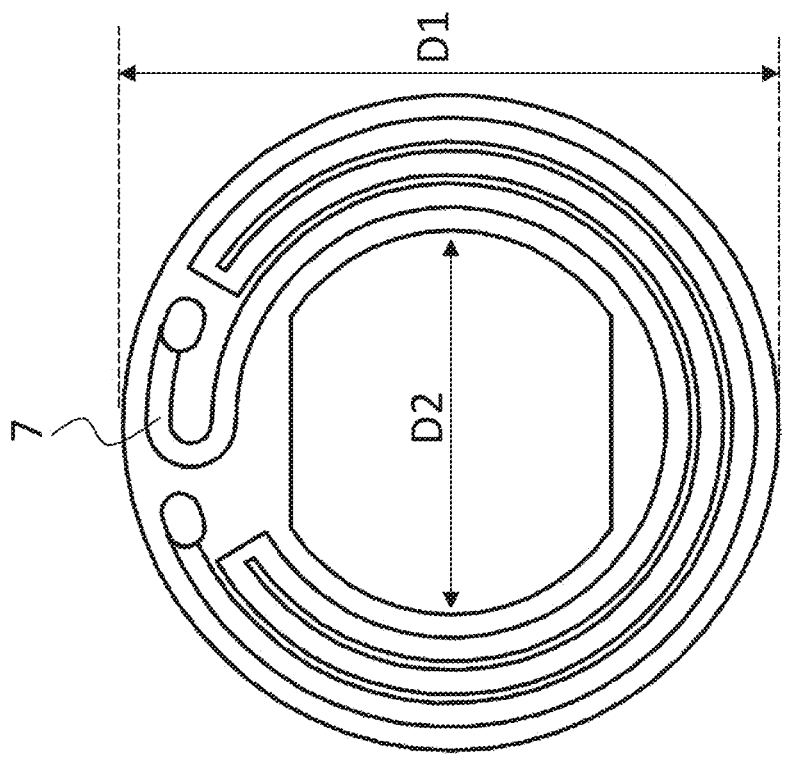
FIG.1
FIG.2

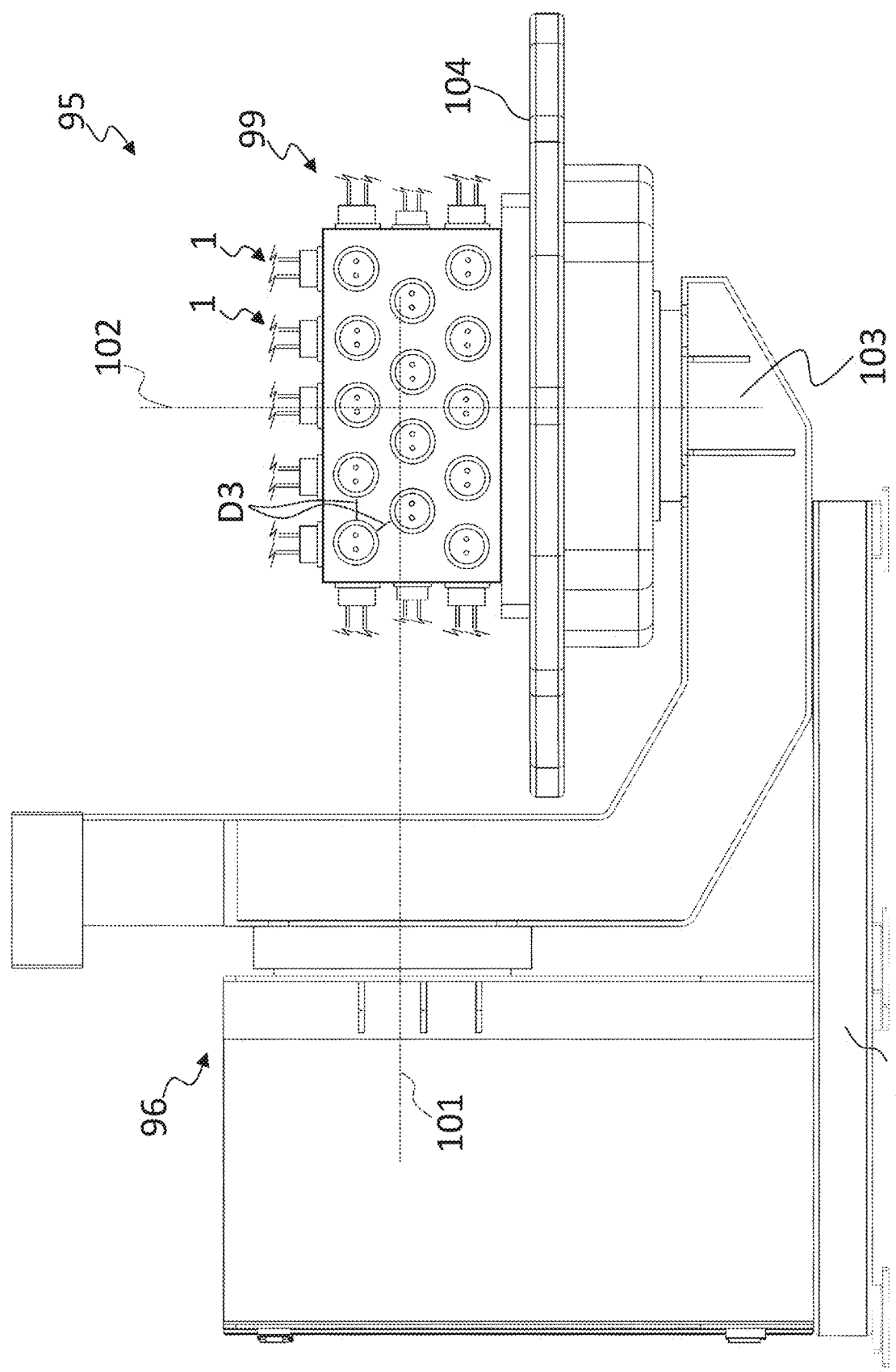

MOULD FOR ROTATIONAL MOULDING

TECHNICAL FIELD OF THE INVENTION

The present invention relates to a mould for rotational moulding.

STATE OF THE ART

Rotational moulding is a moulding technology used to make finished products, typically made of thermoplastic material, internally hollow (with open cavity, i.e. in communication with the external environment, or closed). Objects typically made using rotational moulding technology are for example: parts of motor vehicles (e.g. roofs for trucks, tractors, etc.), boats (e.g. kayaks), tanks/cisterns (e.g. for fuels, for water, etc.), bins, vases, street furniture, toys, garden furniture, etc.

The rotational moulding process typically comprises providing a mould having a (inner) cavity suitably counter-shaped to the geometry of the finished product to be made. The mould is loaded with a raw polymeric material, typically in powder form, and then closed. The mould, once firmly secured to a rotational moulding machine, is rotated about two or more axes of rotation (typically mutually perpendicular) and simultaneously subjected to a heating/cooling time program.

The rotation of the mould allows to distribute the raw polymeric material along the whole useful surface of the mould cavity, in order to cover this surface with at least one layer of such polymeric material. At the same time, the heating of the mould allows the raw polymeric material to soften and sinter, and thus adhering to the surface of the cavity, reproducing its shape. For the quality of the finished product, it is advisable to ensure a desired uniformity of temperature of the surface of the mould cavity.

Subsequently the mould is cooled, opened and the finished product is extracted. It is known to perform the aforementioned heating by means of one or more elongated electrical resistances which develop with continuity onto the external surface of the mould (i.e. the surface that typically remains visible when the mould is completely closed), to ensure a desired uniformity of temperature of the surface of the cavity of the mould. To obtain a wide direct contact between the electrical resistances and the mould, the resistances are housed interlocked by mechanical interference inside the grooves made in the outer surface of the mould.

Document EP 1 837 148 A1, in the name of the same Applicant, discloses a mould with fluid ducts for thermal regulation.

SUMMARY OF THE INVENTION

In the aforementioned context of the rotational moulding processes, the Applicant has found that the known types of heating of the mould have numerous disadvantages and/or can be improved under one or more aspects.

First of all, the Applicant has found that the realization of the elongated and continuous electrical resistances necessarily represents a complication in the manufacture and/or management of the mould, in terms of economic and/or time, at least because an intervention, even localized, of maintenance of the resistances typically requires replacement of the whole resistance.

Furthermore, the Applicant has also realized that the use of a plurality of fluid ducts for thermal regulation which develop with continuity for long stretches substantially over the whole surface extension of the body of the mould is disadvantageous (whether such ducts are made starting from grooves which are closed by means of an additional cover, as in EP 1 837 148 A1, or the ducts are entirely incorporated into the walls of the mould, e.g. by drilling the walls).

In fact, regardless of the adopted method, the realization of the ducts also involves a considerable complication in the manufacture of the mould, with consequent increase of costs.

The Applicant has therefore posed the problem of heating a mould for rotational moulding in an efficient way, for example in terms of times and/or costs and/or of desired temperature uniformity (e.g. at the surface of the inner cavity of the mould), and/or in a structurally simple and/or reliable and/or versatile way, e.g. with respect to the possible variations of the process, and/or to the possible shapes of the mould. According to the Applicant, the above problem is solved by a mould for rotational moulding according to the attached claims and/or having one or more of the following features.

According to an aspect the invention relates to a mould for rotational moulding. The mould comprises:
  a main body having an inner cavity and an outer surface;
  a plurality of heating elements distinct from each other and removably fixed to said main body in distributed way onto said outer surface of the main body,
wherein each heating element comprises:
  a thermally conductive base body in thermal contact with said outer surface of the main body;
  an electrically insulating layer adhered to said base body (entirely) at opposite side to said outer surface;
  an electrically resistive track made on said electrically insulating layer,
wherein the base bodies are spatially separated from each other.

According to an aspect, the invention relates to a system for rotational moulding comprising a machine for rotational moulding and said mould for rotational moulding according to the present invention, said mould being secured to said machine to rotate about at least two axes of rotation.

The Applicant believes he has overcome the industrial paradigm of using elongated electrical resistances that run with continuity over the whole outer surface, to replace them with a plurality of heating elements distinct from each other and removably fixed to the outer surface in spatially separated way, wherein each heating element has the aforesaid structure made of layers superimposed moving away from the outer surface. In this way the fixing and/or maintenance of such heating elements is simplified with respect to the elongated electric resistors, and therefore the costs of making and/or maintaining the mould are limited, while obtaining a desired heating level.

The Applicant notes that the type of heating elements of the present invention has been selected among a large number of possible types of heating elements, taking into account numerous factors (e.g. specific thermal power, cost, size and versatility of the conformation, weight, heating and cooling times, ease of installation, maintenance and use, etc.) and finding, with the present solution, the best compromise between such factors.

By the term "electrically resistive" it is meant a material/element capable of providing desired electrical resistance properties against an electrical voltage applied to the material/element itself. For example, the electrical resistance values can vary from a few tens of Ohms per unit area, up to even 1 MΩ per unit area.

By "substantially perpendicular" with respect to geometric elements (such as straight lines, planes, surfaces etc.) it is meant that these elements form an angle of 90°+/−15°, preferably of 90°+/−10°.

By "substantially parallel" with respect to the aforementioned geometric elements it is meant that these elements form an angle of 0°+/−15°, preferably of 0°+/−10°.

The present invention in one or more of the above aspects may exhibit one or more of the following preferred features.

Preferably said heating elements are equal to each other. By the expression "equal" it is meant that the elements all have the same structure, shape and size (except for the manufacturing tolerances). In this way the construction of the heating elements is simplified (e.g. they can be mass-produced), as well as the construction of the mould.

Preferably said base body comprises a first and a second face mutually opposite, wherein said second face is faced towards said outer surface. Preferably said second face is flat. In this way a desired heat exchange is obtained, without the need, as instead for the known elongated electrical resistances, of mechanically forcing the resistances into suitable grooves made on the outer surface (where the intimate thermal contact between the electrical resistance and the main body is obtained by mechanical interlocking and plastic deformation of the resistance and of the groove, also creating undercuts at the mouth of the groove, all the above hindering the reversible removal of the electrical resistance).

Preferably said outer surface comprises, for each second face, a corresponding plane region. In case of an originally non-flat outer surface, it is advantageous to obtain (e.g. by milling) said plane region on the outer surface.

In one embodiment, at said plane region, the outer surface has a housing seat for said base body (e.g. also obtained by milling of the outer surface).

Preferably said second face is contained within a footprint of said housing seat (in other words, the base body is inserted into the seat without mechanical interference with the walls of the seat itself). In this way, the fixing of the heating element is reversible (i.e. the disassembly of the element does not damage either the main body or the heating element). Furthermore, the heating element is more easily accessible than the elongated electric resistances. In this way, there are reduced, if not eliminated, some problems typical of the elongated electrical resistances housed in the grooves, such as the risk of damage to the mould during maintenance/replacement of the resistances, detachment of the resistances from the groove due to different thermal expansion between electrical resistances and main body, which causes the onset of localized stresses in the resistances and/or in the mould and/or localized worsening of the heat transfer).

Preferably a maximum dimension of said base body (e.g. said second face) is inscribed into a circumference having diameter greater than or equal to 3 cm, more preferably greater than or equal to 6 cm, and/or less than or equal to 15 cm, more preferably less than or equal to 12 cm. In this way, sufficient space is provided for the track limiting the space occupied by the heating element. Furthermore, in the aforementioned case of plane region obtained on the outer surface for fixing the heating element, the aforementioned values of extension of the base body limit the variation of the local thickness of the main body at the second face, improving the uniformity of heating.

Preferably a minimum distance between each base body and respective closest base bodies is greater than or equal to one sixth, more preferably greater than or equal to one fourth, even more preferably greater than or equal to one third, of said diameter of the circumference into which the base body is inscribed.

The Applicant has realized that the heating elements according to the present invention allow to obtain, even in case of small footprint and appropriate spacing between the base bodies (i.e. by adopting a discretization of the heating action, substantially different from the substantially spatially continuous heating action of the elongated electrical resistances of the known art), both a desired heating rate and a desired heating uniformity at the surface of the inner cavity of the main body, thanks also to the high specific thermal power obtainable (by means of electrical voltage applied to the track).

Preferably said base body is plate-like, more preferably with constant thickness. In this way the thermal resistance of the base body is reduced and/or the thermal power is effectively distributed.

Preferably the thickness of the base body is greater than or equal to 1 mm, and/or less than or equal to 3 mm, more preferably less than or equal to 2 mm. In this way the thermal resistance is limited without jeopardizing the structural strength.

Preferably said base body comprises a through opening (e.g. a hole) at a substantially central portion thereof, more preferably the base body has (substantially) annular shape. In this way the thermal power transferred to the mould at the centre of the heating element is reduced (e.g. to reduce the onset of hot spots and/or to uniform the temperature).

In one embodiment said mould comprises, for each heating element, a relief integral with said outer surface and which engages said through opening of the respective heating element. In this way the positioning of the heating elements is facilitated, which can be fitted on the respective reliefs.

Preferably each relief has, in top view, a shape counter-shaped to a top view shape of the through opening of the respective heating element. Preferably each relief has, in top view, a shape devoid of rotational symmetry about an axis (substantially) perpendicular to the outer surface. In this way the base body can be applied to the outer surface in one and only one angular position with respect to the relief, further facilitating the application of the heating elements.

Preferably a maximum dimension of said through opening (more preferably a diameter of said hole) is greater than or equal to 1.5 cm, more preferably greater than or equal to 3 cm, and/or less than or equal to 8 cm, more preferably less than or equal to 6 cm.

In this way, structural strength and width of the opening are balanced to obtain a desired reduction in the thermal power transferred to the outer surface.

Preferably each heating element is based on a thick film heating technology, more preferably it is a thick film heater. This technology has proven to be highly versatile and efficient.

Preferably said track is printed (e.g. by screen printing, direct-write deposition, ink-jet printing, etc.) onto said electrically insulating layer (which is preferably arranged adjacent to said first face of the base body). In this way the track is made in an industrially simple way.

Preferably said track is made of a polymeric resistive paste (or ink), more preferably comprising an organic matrix and a metal oxide powder dispersed into said matrix. These resistive pastes have proved to be particularly suitable for making heating elements capable of generating the desired specific thermal power (e.g. thermal power per unit surface) to heat the surface of the inner cavity of the main body on which the raw material placed in the mould is sintered, in face of limited costs, dimensions and/or weight.

Preferably said (preferably single) track covers substantially all said first face. In this way the uniformity of heating is improved.

Preferably said track is substantially two-dimensional. In this way the dissipation of thermal power in the air at the lateral surfaces (along the thickness) of the track, and/or the overheating and/or thermal resistance of the track is limited.

Preferably said track has thickness (along a direction substantially perpendicular to said first face) greater than or equal to 10 µm, more preferably greater than or equal to 15 µm, and/or less than or equal to 30 µm, more preferably less than or equal to 25 µm. Preferably said track has width (along a direction substantially parallel to said first face and substantially perpendicular to a main development line of the track) greater than or equal to 1.5 mm, more preferably greater than or equal to 2 mm, and/or less than or equal to 3.5 mm, more preferably less than or equal to 3 mm. In this way the substantially two-dimensional track is realized.

Preferably each heating element comprises a first and a second connector arranged in electrical contact (direct or not, for example by means of one or more electrically conductive tracks interposed between the connectors and the electrically resistive track) with said track. In this way the resistive track is powered.

Preferably each heating element comprises a protective (and electrically insulating) layer arranged onto said track (at opposite side to the electrically insulating layer). In this way, the track is protected (e.g. from dust, water, chemical agents, etc.) and/or the safety of the heating element is improved.

Preferably each heating element comprises a respective fastening element removably (and reversibly, e.g. by means of a screw which engages a respective threaded hole made in the main body) fixed to said outer surface for removably fastening said base body to said outer surface. Preferably said fastening element comprises an abutment surface shaped for clamping said base body, in cooperation with said outer surface. In this way the heating element is fixed in a removable and constructively simple way.

Preferably said fastening element is arranged at said through opening of the base body (e.g. engages said through opening), said abutment surface at least partially clamping an edge of said through opening. In this way, the overall footprint of the heating element is limited. Furthermore, the fastening element in this substantially central position of the base body contributes to limit the generation of hot spots in the portion of the main body arranged substantially at the centre of the base body.

Preferably said fastening element comprises an inner chamber having an inlet mouth and an outlet mouth (for a cooling fluid, e.g. water). In this way the fastening element can contribute to, or realize, the cooling of the body of the mould.

In one embodiment said mould comprises a junction layer made of thermally conductive material (directly) interposed between each base body and said main body, and/or a further junction layer made of thermally conductive material (directly) interposed between each fastening element and said main body.

Preferably said junction layer and/or said further junction layer comprises, more preferably it is entirely made of, a, preferably thermoset, electrically conductive paste (e.g. charged with particles of metallic chemical elements to facilitate the electrical conduction). The paste in the plastic state (i.e. not-yet-thermoset), uniformly filling any surface (e.g. microscopic) cavities of the main body and/or of the heating/fastening element due to the respective surface roughness, allows to improve the mutual contact between the mould and heating/fastening elements, and consequently the heat transfer.

In one embodiment said junction layer and/or said further junction layer comprises, more preferably it is entirely made of, a graphite sheet. In this way the installation is simplified.

Preferably said system comprises a recirculation circuit of said cooling fluid connected to said inlet mouth and to said outlet mouth of each fastening element. Preferably said recirculation circuit connects the fastening elements in parallel with each other. In this way, the cooling fluid enters the fastening elements at substantially the same temperature, promoting uniformity of cooling.

Preferably said machine comprises a fixed frame (to support the mould and the moving parts of the machine) and a movement system coupled to said frame and structured to rotate said mould about said at least two axes of rotation (preferably mutually perpendicular).

BRIEF DESCRIPTION OF THE DRAWINGS

FIG. 1 shows a schematic top view of a component of a mould according to the present invention;

FIG. 2 shows a perspective schematic view of the component of FIG. 1;

FIG. 4 shows a schematic side view of a system for rotational moulding according to the present invention.

DETAILED DESCRIPTION OF SOME EMBODIMENT OF THE INVENTION

Figure 3:
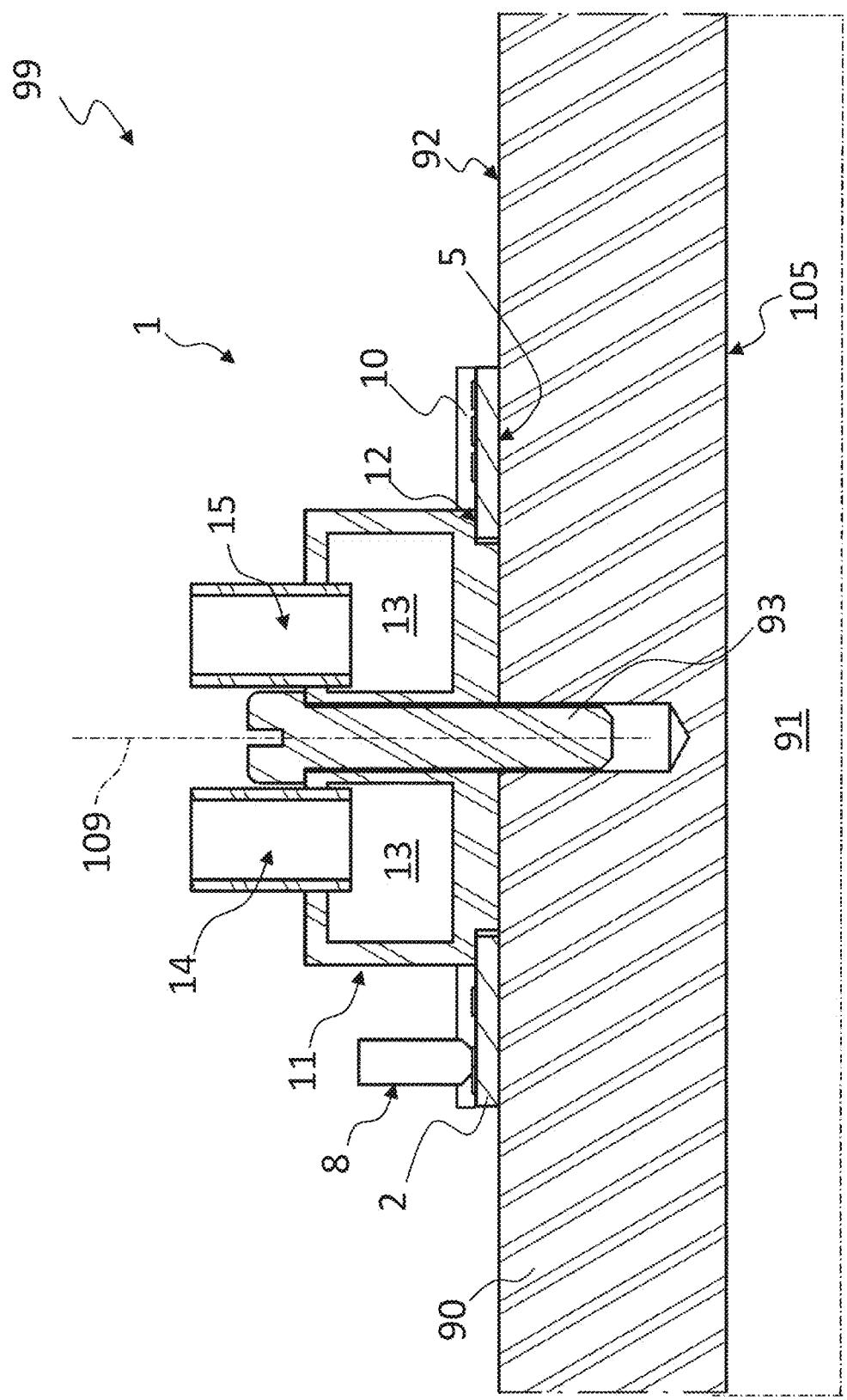
FIG. 3 shows a schematic sectional view of a portion of a mould according to an embodiment of the present invention.

The features and the advantages of the present invention will be further clarified by the following detailed description of some embodiments, presented by way of non-limiting example of the present invention, with reference to the attached figures (not to scale).

In the figures, with the number 99 it is indicated a mould for rotational moulding according to the present invention. Exemplarily (FIG. 4) the mould 99 comprises a main body 90 having an inner cavity 91 (partially shown in FIG. 3) and an outer surface 92.

Exemplarily, for simplicity, the main body 90 of the mould is schematically shown in the shape of a parallelepiped (FIG. 4). Exemplarily the inner cavity 91 of the mould comprises a sintering surface 105 on which the raw polymeric material is sintered.

Exemplarily the mould 99 also comprises a plurality of heating elements 1 distinct from each other and removably fixed to the main body 90 in distributed way onto the outer surface 92. Exemplarily the heating elements 1 are equal to each other and substantially homogeneously distributed onto the outer surface (optionally, different distributions of the heating elements can be provided, for example to concentrate the thermal power).

In one embodiment (not shown) the mould comprises two or more (e.g. up to four or five) plurality of heating elements, each plurality being according to the present invention, wherein the heating elements of each plurality are equal to each other and different (in shape and/or size) from the heating elements of the remaining pluralities.

For example, there can be provided two plurality of heating elements having a circular shape in top view but with different diameter, and a plurality of heating elements having a rectangular shape in top view.

Exemplarily each heating element 1 comprises a plate-like base body 2 (shown in detail in FIGS. 1 and 2) with constant thickness of about 1.5 mm. Exemplarily the base bodies 2 are all spatially separated from each other (FIG. 4).

Exemplarily each base body comprises a first 4 and a second face 5 mutually opposite, both flat, the second face 5 being faced towards the outer surface 92 (FIG. 3).

Advantageously, the outer surface can comprise, for each second face, a corresponding plane region (e.g. obtained by milling in case of an originally non-flat outer surface). In one embodiment (not shown), at the plane region, the outer surface can also have a housing seat for the base body (e.g. also obtained by milling the outer surface). Preferably the second face is contained within a footprint of the housing seat.

Exemplarily each base body is made of thermally conductive material, e.g. steel.

Exemplarily each heating element has substantial cylindrical symmetry about an axis of symmetry 109, wherein each base body has substantially annular shape with a through opening 3 at substantially central portion thereof (exemplarily the development of the resistive track, the position of the connectors and the top view shape of the through opening are exceptions to the cylindrical symmetry). Exemplarily an outer diameter D1 of each base body 2 is approximately 9 cm and a maximum dimension D2 of each through opening 3 (exemplarily measured at the rounded edges of the opening) is approximately 4 cm.

Exemplarily a minimum distance D3 between each base body and respective closest base bodies is approximately 4 cm (greater than one third of the outer diameter D1).

Exemplarily each heating element 1 comprises an electrically insulating layer 6 adhered to the base body 2, adjacent to the first face 4, at opposite side to the outer surface 92. Advantageously (not shown) the electrically insulating layer 6 can be printed, laminated, or applied as a coating onto the respective base body. In FIG. 3 the electrically insulating layer 6 is not shown.

Exemplarily each heating element 1 comprises an electrically resistive track 7 printed (e.g. by screen printing) on the electrically insulating layer 6.

Exemplarily (not shown) the track 7 is made of a polymer resistive paste, preferably comprising an organic matrix and a powder of metal oxides dispersed into the matrix.

Exemplarily the track 7 is made of a resistive polymer paste of the RS121xx™ series marketed by Ferro Corporation™. The fresh resistive paste is first deposited onto the electrically insulating layer and then subjected to a hardening process (e.g. polymerization) to create the resistive track.

Document U.S. Pat. No. 4,639,391 in the name of CTS Corporation™ also describes a resistive paste suitable for making a resistive track efficient for the purposes of the present solution.

Exemplarily the track 7 is single (i.e. structurally continuous) and covers substantially all the first face 4.

Exemplarily the track 7 is substantially two-dimensional, with thickness (along a direction substantially perpendicular to the first face 4) equal to about 18 μm, and width (along a direction substantially parallel to the first face 4 and substantially perpendicular to a main development line of the track) equal to about 2.5 mm.

Exemplarily each heating element 1 comprises a first 8 and a second connector (only one is shown in FIG. 3) arranged in electrical contact with the track 7.

Optionally each heating element can comprise one or more electrically conductive tracks interposed between the connectors and the electrically resistive track, in order to power the resistive track. The conductive track can also be made by means of printing techniques onto the electrically insulating layer 6 and typically comprises particles of a noble metal, for example silver, to facilitate the electrical conduction.

Exemplarily, FIGS. 1 and 2, each heating element 1 comprises a pair of electrically conductive tracks 70 (of limited length) which form a pair of electrical contact areas for the two connectors.

In an embodiment, not shown, the connectors can directly contact the resistive track.

Exemplarily each heating element 1 comprises a protective and also electrically insulating layer 10 (FIG. 3), exemplarily arranged on the track 7 at opposite side to the electrically insulating layer 6.

Exemplarily each heating element is a thick film heater.

Exemplarily each heating element 1 comprises a fastening element 11 removably fixed to the outer surface 92 (e.g. by means of a screw 93 which engages a respective threaded hole made in the main body) for removably fastening the base body 2 to the outer surface.

Exemplarily the fastening element 11 comprises an abutment surface 12 shaped for clamping the base body 2, in cooperation with the outer surface 92. Exemplarily the fastening element 11 engages the through opening 3, the abutment surface 12 at least partially clamping an edge of the through opening 3.

Exemplarily the fastening element 11 comprises an inner chamber 13 having an inlet mouth 14 and an outlet mouth 15 for a cooling fluid (not shown).

In one embodiment (not shown) the mould comprises, for each heating element, a relief integral (e.g. integrated) to the outer surface and which engages the through opening of the respective heating element. Preferably each relief has, in top view, a shape counter-shaped to a top view shape of the through opening of the respective heating element, and devoid of rotational symmetry about an axis substantially perpendicular to the outer surface. In this embodiment the fastening element is removably fixed to the outer surface at the relief of the respective heating element (e.g. above the relief), the fastening element having in top view a footprint (at least partially) greater than the top view footprint of the relief to realize the aforementioned abutment surface.

Preferably the mould comprises a plurality of temperature probes (not shown) applied to the outer surface, wherein each probe returns a respective signal representative of a local temperature of the outer surface. In this way the temperature distribution of the outer surface is sampled. Preferably a (specific) thermal power generated by a given heating element (or by a given subset of heating elements) is adjusted as a function of a signal returned respectively by one or more of the temperature probes arranged with a given spatial relationship with respect to the given heating element. Exemplarily each heating element can provide a specific thermal power within the range of 15-20 W/cm$^2$.

Exemplarily (not shown) the mould comprises a junction layer made of thermally conductive material directly interposed between the base body of each heating element and the main body, and a further junction layer (not shown) made of thermally conductive material directly interposed between each fastening element and main body. Exemplarily the junction layer and the further junction layer are entirely made of an electrically conductive thermoset paste (e.g. as of the type used to make the conductive tracks 70).

With reference to FIG. 4, it shows a system 95 exemplarily comprising a machine 96 for rotational moulding and the mould 99 for rotational moulding according to the present invention, the mould 99 being coupled to the machine to rotate about two axes of rotation 101, 102 mutually perpendicular.

Exemplarily the machine 96 comprises a fixed frame 97 (to support the mould and the moving parts of the machine) and a movement system coupled to the frame 97 and structured to rotate the mould about the two axes of rotation 101, 102. Exemplarily the movement system comprises an "L" arm 103 (only partially shown) rotationally fixed to the frame 97 (realizing the first axis of rotation 101), and a plate 104 rotationally fixed to the arm 103 (realizing the second axis of rotation 102), the mould 99 exemplarily being rigidly fixed to plate 104.

In one embodiment, not shown, the mould 99 can in turn be rotationally fixed to the plate 104 to provide a third axis of rotation perpendicular to the other two axes of rotation in at least one configuration of the machine.

Exemplarily the machine 96 comprises an electric power supply circuit (not shown) for supplying the heating elements 1, for example arranged in series by sub-groups.

Exemplarily (not shown) the system 95 comprises a recirculation circuit of the cooling fluid connected to the inlet mouth 14 and to the outlet mouth 15 of each fastening element 11, the recirculation circuit connecting the fastening elements in parallel with each other.

The invention claimed is:

1. A mould for rotational molding, the mould comprising:
a main body having an inner cavity and an outer surface;
a plurality of heating elements distinct from each other and removably fixed to said main body in distributed way onto said outer surface of the main body, wherein each heating element comprises:
a thermally conductive base body in thermal contact with said outer surface of the main body;
an electrically insulating layer adhered to said base body at opposite side to said outer surface;
an electrically resistive track made on said electrically insulating layer, wherein the base bodies are spatially separated from each other.

2. The mould according to claim 1, wherein said heating elements are equal to each other, wherein said base body comprises a first and a second face mutually opposite, wherein said second face is faced towards said outer surface, wherein said second face is flat, wherein said base body is plate-like, with thickness greater than or equal to 1 mm, and less than or equal to 3 mm, and wherein said track covers substantially all said first face.

3. The mould according to claim 1, wherein a maximum dimension of said base body is inscribed into a circumference having diameter greater than or equal to 3 cm, and less than or equal to 15 cm, and wherein a minimum distance between each base body and respective closest base bodies is greater than or equal to one sixth of said diameter of the circumference into which the base body is inscribed.

4. The mould according to claim 1, wherein said base body comprises a through opening at a substantially central portion thereof, wherein a maximum dimension of said through opening is greater than or equal to 1.5 cm, and less than or equal to 8 cm, and wherein said base body has substantially annular shape.

5. The mould according to claim 4, comprising, for each heating element, a relief integral with said outer surface and which engages said through opening of the respective heating element, wherein each relief has, in top view, a shape counter-shaped to a top view shape of the through opening of the respective heating element, and devoid of rotational symmetry about an axis substantially perpendicular to the outer surface.

6. The mould according to claim 1, wherein said track is printed onto said electrically insulating layer, wherein said track is made of a polymeric resistive paste, comprising an organic matrix and a metal oxide powder dispersed into said matrix, wherein said track is substantially two-dimensional, wherein said track has thickness greater than or equal to 10 µm and less than or equal to 30 µm, and has width greater than or equal to 1.5 mm and less than or equal to 3.5 mm, and wherein each heating element is based on a thick film heating technology.

7. The mould according to claim 1, wherein each heating element comprises a protective layer arranged onto said track at opposite side to the electrically insulating layer.

8. The mould according to claim 1, wherein each heating element comprises a respective fastening element removably fixed to said outer surface for removably fastening said base body to said outer surface, wherein said fastening element comprises an abutment surface shaped for clamping said base body, in cooperation with said outer surface, wherein said fastening element is arranged at a through opening of the base body, said abutment surface at least partially clamping an edge of said through opening, wherein said fastening element comprises an inner chamber having an inlet mouth and an outlet mouth.

9. The mould according to claim 1, comprising a junction layer made of thermally conductive material interposed between each base body and said main body, wherein said junction layer comprises a, preferably thermoset, electrically conductive paste or a graphite sheet.

10. A system for rotational moulding, the system comprising a machine for rotational moulding and said mould for rotational moulding according claim 1, said mould being secured to said machine to rotate about at least two axes of rotation.

* * * * *